(12) United States Patent
Bächler

(10) Patent No.: US 11,276,992 B2
(45) Date of Patent: Mar. 15, 2022

(54) METHOD FOR ELECTRICAL CABLING WITH A CABLE SEQUENCE OF ELECTRONIC COMPONENTS IN SWITCHGEAR CONSTRUCTION AND A CORRESPONDING ROBOT ARRANGEMENT

(71) Applicant: RITTAL GMBH & CO. KG, Herborn (DE)

(72) Inventor: Andreas Michael Bächler, Haiger (DE)

(73) Assignee: RITTAL GMBH & CO. KG

( * ) Notice: Subject to any disclaimer, the term of this patent is extended or adjusted under 35 U.S.C. 154(b) by 0 days.

(21) Appl. No.: 16/767,158

(22) PCT Filed: Nov. 8, 2018

(86) PCT No.: PCT/DE2018/100906
§ 371 (c)(1),
(2) Date: May 27, 2020

(87) PCT Pub. No.: WO2019/105502
PCT Pub. Date: Jun. 6, 2019

(65) Prior Publication Data
US 2020/0388997 A1    Dec. 10, 2020

(30) Foreign Application Priority Data

Nov. 29, 2017  (DE) ................. 10 2017 128 295.5

(51) Int. Cl.
*H01K 3/10* (2006.01)
*H02G 1/12* (2006.01)
(Continued)

(52) U.S. Cl.
CPC ........... *H02G 1/1248* (2013.01); *H01R 43/28* (2013.01); *H02B 3/00* (2013.01); *G05B 2219/45097* (2013.01); *Y10T 29/49162* (2015.01)

(58) Field of Classification Search
CPC ........... Y10T 29/4913; Y10T 29/49155; Y10T 29/49133; Y10T 29/49147; H02G 1/1248; H01R 43/28
(Continued)

(56) References Cited

U.S. PATENT DOCUMENTS 5,115,545 A * 5/1992 Fujimoto ............... H01L 24/75
29/25.01
6,079,097 A    6/2000 Henrici et al.
(Continued)

FOREIGN PATENT DOCUMENTS

DE    4431254 A1    3/1996
DE    29721028 U1   12/1998
(Continued)

OTHER PUBLICATIONS

M. Busi et al. "The WIRES Experiment: Tools and Strategies for Robotized Switchgear Cabling" *Procedia Manufacturing*, vol. 11, Jan. 1, 2017 (Jan. 1, 2017), pp. 355-363 DOI: 10.1016/j.promfg. 2017.07.118 ISSN: 2351-9789, XP055539776 the whole document.
(Continued)

*Primary Examiner* — Thiem D Phan
(74) *Attorney, Agent, or Firm* — Harness, Dickey & Pierce, P.L.C.

(57) ABSTRACT

A method for electrical wiring of electronic components in switchgear construction, the method comprising the steps:
a. providing a plurality of electronic components which are mounted on a shared workpiece, in particular on a mounting plate;
b. wiring the electronic components according to a predetermined circuit diagram and in a predetermined order by at least one robot, wherein a cable sequence of preassembled cables is fed to the at least one robot and the cables are arranged in the predetermined order in the cable sequence;
(Continued)

Figure 1:
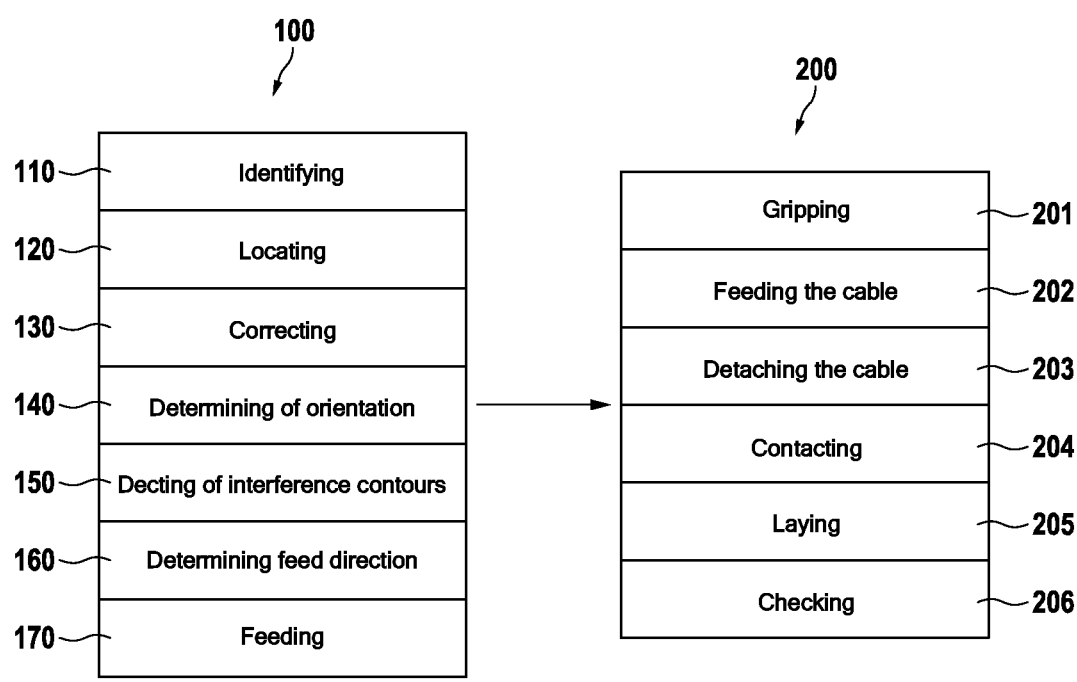

wherein the wiring comprises gripping a free cable end of the cable sequence by a multifunctional end effector of the robot, feeding the free cable end to an electrical connection of one of the electronic components by the multifunctional end effector, and detaching the cable from the cable sequence by a separation unit of the multifunctional end effector.

10 Claims, 3 Drawing Sheets

(51) Int. Cl.
  *H01R 43/28* (2006.01)
  *H02B 3/00* (2006.01)
(58) Field of Classification Search
  USPC ....... 29/850, 33 M, 739, 740, 748, 759, 832, 29/834, 854, 857, 863
  See application file for complete search history.

(56) References Cited

U.S. PATENT DOCUMENTS

| | | | |
|---|---|---|---|
| 6,225,561 | B1 | 5/2001 | Mori |
| 6,385,845 | B2 | 5/2002 | Mori |
| 8,082,664 | B2 * | 12/2011 | Dohmen ................ H01R 43/28 29/857 |
| 2001/0006112 | A1 | 7/2001 | Mori |
| 2018/0108458 | A1 | 4/2018 | Maki et al. |

FOREIGN PATENT DOCUMENTS

| | | |
|---|---|---|
| DE | 19756750 C1 | 8/1999 |
| DE | 19918377 A1 | 11/1999 |
| DE | 10162327 A1 | 5/2003 |
| DE | 102008013591 A1 | 9/2009 |
| DE | 102014116772 A1 | 5/2016 |
| DE | 102015103444 A1 | 9/2016 |
| EP | 0440955 B1 | 3/1995 |
| EP | 0924818 A2 | 6/1999 |
| EP | 0917259 B1 | 8/2001 |
| WO | 2009112520 A1 | 9/2009 |
| WO | 2015193248 A1 | 12/2015 |
| WO | WO-2017005282 A1 | 1/2017 |
| WO | WO-2017038479 A1 | 3/2017 |

OTHER PUBLICATIONS

System Robot Automazione. "Syndy, The independent solution", Visano, Italy, Mar. 31, 2012 (Mar. 31, 2012), pp. 1-16, Retrieved from the Internet: http://www.systemrobot.it/en/crlines/wiring-syndy [retrieved on Jan. 9, 2019] XP055539797 the whole document.

International Search Report (in English and German) and Written Opinion of the ISA (in German) issued in PCT/DE2018/100906, dated Jan. 22, 2019; ISA/EP.

* cited by examiner

METHOD FOR ELECTRICAL CABLING WITH A CABLE SEQUENCE OF ELECTRONIC COMPONENTS IN SWITCHGEAR CONSTRUCTION AND A CORRESPONDING ROBOT ARRANGEMENT

CROSS-REFERENCE TO RELATED APPLICATIONS

This application is a 371 U.S. National Phase of International Application No. PCT/DE2018/100906, filed on Nov. 8, 2018, which claims the benefit of German Patent Application No. 10 2017 128 295.5, filed on Nov. 29, 2017. The entire disclosures of the above applications are incorporated herein by reference.

BACKGROUND

This section provides background information related to the present disclosure which is not necessarily prior art.

TECHNICAL FIELD

The invention relates to a method for electrical wiring of electronic components in switchgear construction and a corresponding arrangement, as is known from EP 0 917 259 B1. A similar method is also known from DE 44 312 54 A1.

DISCUSSION

In switchgear construction, there is basically a great need to automate the wiring of electronic components that are pre-assembled, for example, on a mounting plate for a switch cabinet. This is contrasted, however, by the sometimes high complexity of such switchgear. Not only is the cable routing between the individual components sometimes highly complex, but also a large number of different cables (length, cross-section, colour, wire end treatment, etc.) are required to be installed within a switchgear. Furthermore, the electronic components to be wired are highly diverse, especially with regard to the type and position of the contacts and the direction in which the end of the cable is fed to a connection of the respective component.

In order to respond to the high complexity with regard to the large number of different cables, a cable sequence is known from DE 10 2015 103 444 A1 for the wiring of an electrical switchgear in which pre-assembled cables, including wire end treatment, are linked together in a prescribed sequence. For the wiring of the electronic components of the switchgear, the individual cables only have to be separated from the cable sequence, which results in a cable with all cable properties (such as length, cross-section, colour and wire end treatment) that can be processed directly for the wiring of electronic components in the switchgear.

However, the use of such cable sequences has the disadvantage that they can no longer be used with the standard automatic wiring machines, such as those known e.g. from EP 0 917 259 B1.

SUMMARY

This section provides a general summary of the disclosure, and is not a comprehensive disclosure of its full scope or all of its features.

It is therefore the aspect of the invention to propose a method for electrical wiring of electronic components in switchgear construction as well as a corresponding arrangement which allows the fully automated wiring of the electronic components.

Accordingly, it is provided that the method for electrical wiring of electronic components comprises the steps:
a. providing a plurality of electronic components which are mounted on a shared workpiece, in particular on a mounting plate;
b. wiring the electronic components according to a predetermined circuit diagram and in a predetermined order with at least one robot, wherein a cable sequence of pre-assembled cables is fed to the robot and the cables are arranged in the predetermined order in the cable sequence;

wherein the wiring comprises gripping a cable end of the cable sequence by a multifunctional end effector of the robot, feeding the cable end to an electrical connection of one of the electronic components by the multifunctional end effector, and detaching the cable from the cable sequence by a separation unit of the multifunctional end effector. The method may further comprise laying a cable of the cable sequence in a cable duct, contacting a cable of the cable sequence at a conductor connection clamp and/or mechanically and/or electrically testing a contacting made.

The proposed solution is therefore particularly suitable for the automated wiring of mounting plates already populated with electronic components. The control of at least one robot can be carried out automatically on the basis of a circuit diagram which represents the electrical wiring of the electronic components and the arrangement of the components on the mounting plate.

The cable sequence is not restricted to any particular embodiment and is to include all systematic arrangements of a plurality of at least partially pre-assembled cables, optionally using a suitable provision medium. The cable sequence can, for example, be provided according to the teaching of DE 10 2015 103 444 A1 as a roll of individual cables connected to each other via their ends. Alternatively, the cable sequence can be provided as a storage magazine. According to another embodiment, the cables of the cable sequence can be provided taped essentially parallel to each other. The cable sequence can be provided, for example, in the form of a bar magazine or in a cable drum.

Since it is not possible to mount the components on the mounting plate completely free of tolerances, it may be necessary to correct the control of the robot, taking into account any detected tolerances and deviations in the arrangement of the components on the mounting plate. Thus, the method may include identifying and locating of the electronic components on the shared workpiece, in particular the mounting plate. For the identifying, the multifunctional end effector can, for example, have an optical unit which either detects a unique identification of the electronic components or via which the geometry and/or the position of a respective component on the workpiece is detected by means of image processing. Identifying and locating of the electronic components is not limited to such methods.

The circuit diagram may comprise initial position information of at least one of the components with respect to the workpiece, the method further comprising correcting the initial position information when a deviation between the initial position information and a determined position information of at least one of the components has been detected when identifying and locating.

A position and/or an orientation of the electrical connection of one of the electronic components can be determined, wherein furthermore interfering contours in the area surrounding the electrical connection can be detected, if present, and wherein a feed direction of the cable end to the connection is determined taking into account the position and orientation of the electrical connection as well as possibly detected interfering contours and, optionally, further taking into account degrees of freedom of movement of the robot. The robot can then insert the cable end into the connection along the determined feed direction in order to contact it at the connection.

The cable sequence can be fed to a separating device of the multifunctional end effector, with which in the cable sequence, the end-positioned cable with the cable end is separated or detached from the cable sequence. The robot or the multifunctional end effector, respectively, may have a means of transport for the cable sequence. For example, the separating can comprise cutting out in accordance with the teaching of DE 10 2015 103 444 A1 or detaching in the sense of releasing a plug-in or adhesive connection.

The cable sequence can be a cable chain in which the pre-assembled individual cables are connected to one another to form a chain via their cable ends, which may have a wire end treatment. The cable sequence may comprise a series arrangement of a plurality of pre-assembled cables, each having a first and a second cable end. Each of the pre-assembled cables may have a conductor and a conductor insulation, the cable ends being processed for wiring an electrical circuit, in particular in such a way that a respective conductor end is insulation-free at the first cable end and at the second cable end. The cable sequence can also have connections between pre-assembled cables arranged adjacent to one another in the series arrangement. By means of the connections, in each case a first cable end of a pre-assembled cable, previously manufactured as a loose cable end, and a second cable end following in the series arrangement of pre-assembled cables, previously manufactured as a loose cable end, can be connected to one another.

Separating a cable from the cable sequence may comprise separating a connection area via which a first cable end is connected to a second cable end of a cable following or preceding in the cable sequence. In the connection area, the two cables following one another in the cable sequence can be connected to one another in an overlapping manner or also in a butt-jointed, force-locking and/or material-locking manner, in particular welded, spliced, crimped or ultrasonically compacted. Separating can be carried out with the aid of a cutting tool comprising two knives or blades spaced apart by a length of the connection area, in particular two opposing, opposite-running V-knives each with two partial knives or blades spaced apart by the length of the connection area. The connection area may have interconnected wire brushes or cable strands. For example, the cable ends connected to one another via the connection region may be conditioned with wire end sleeves for electrical contacting and each have a wire brush projection of cable strands which protrudes from the wire end sleeve of the respective cable end, the cable ends being connected to one another in the region of the wire brush projection and thus forming the connection region.

The method may further comprise at least one of the following steps a. to d., according to which
a. the multifunctional end effector releases the cable end after the cable end has been contacted at the electrical connection of one of the electronic components,
b. that the cable having the cable end is passed through a cable connection point detection device of the multifunctional end effector,
c. after detecting a cable connection point at which the cable with the cable end is connected to a cable following in the sequence via a connection point, the cable connection point is separated from the cable sequence; and
d. the cable end opposite the cable end is gripped by the multifunctional end effector and fed to a further electrical connection of the electronic components.

An end-positioned cable in the cable sequence that has the cable end can be detached or separated from the cable sequence after the cable end has been contacted at the electrical connection of one of the electronic components. Here, the at least one robot can travel along a laying path of the cable having the cable end after contacting the cable end by its multifunctional end effector, the cable being transported through the end effector at its speed, which corresponds to a speed of the end effector travelling along the laying path. The multifunctional end effector may, for example, comprise a sleeve with detection, separation and feeding function for the feeding and separating of individual wires from the cable sequence.

After feeding the cable end to an electrical connection, the cable end can be contacted at the electrical connection, for which
a. either the cable end is inserted by the multifunctional end effector into a conductor connection clamp with direct plug-in technology of the electrical connection; or
b. a spring clamp terminal of the electrical connection is opened against its preload by the multifunctional end effector, whereupon the cable end is inserted into the spring clamp terminal and then the preloaded spring clamp terminal is released by the multifunctional end effector; or
c. a screw of a screw terminal of the electrical connection is loosened by the multifunctional end effector, whereupon the cable end is inserted into the screw terminal and then the screw of the screw terminal is tightened by the multifunctional end effector.

When the workpiece is a mounting plate for switchgear construction, it can, for example, be transported on a mobile workpiece carrier or a roller conveyor between different processing stations of a production line, wherein, before the plurality of electronic components are arranged on the mounting plate, the mounting plate is first fixed to the workpiece carrier and is only released from the workpiece carrier again when the mounting plate has been mechanically machined, the electrical components have been mounted on the mounting plate, and all wiring has been made in accordance with the circuit diagram, for which purpose the mounting plate has been transported by the mobile workpiece carrier between at least a first processing station for mechanical machining, a second processing station for mounting the electrical components on the mounting plate and a third processing station for the electrical wiring of the electronic components.

The mounting plate is usually mounted in a vertical orientation inside a switch cabinet or provided as a single mounting plate and can be received in this position by the mobile workpiece carrier and mounted on it. The mounting plate and the mobile workpiece carrier can then be removed from the inside of the switch cabinet and transported to the individual processing stations, wherefore for processing at least one of the processing stations, the mounting plate is swivelled from the vertical orientation into a horizontal orientation or into an orientation angled relative to the vertical. It may be provided that the mounting plate is brought back into the vertical orientation after a final assembly and, optionally, after a further technical check, and is inserted in this orientation with the mobile workpiece carrier into the inside of the switch cabinet and connected there to the switch cabinet frame. In this way, a single means of transport is provided in the form of the mobile workpiece carrier, with the aid of which the handling of the mounting plate is transported from the disassembly of the mounting plate from the switch cabinet to the reassembly of the mounting plate inside the switch cabinet to and between the individual processing stations which are required for producing a switchgear on the mounting plate.

The mounting plate with the mobile workpiece carrier can be moved out of the switch cabinet in vertical orientation via an open side wall of the switch cabinet parallel to the door side and parallel to the rear of the switch cabinet. In particular, this means that it is no longer necessary to move the mounting plate out of the switch cabinet via the front side of the switch cabinet, wherein it is usually first necessary to move the mounting plate forwards inside the switch cabinet from a rear mounting position inside the switch cabinet, i.e. move it in the direction of the switch cabinet door in order to receive it there with a workpiece carrier.

It may also be provided that after the cable end has been contacted and fixed at the electrical connection of one of the electronic components, a functional and quality control is carried out by the multifunctional end effector, by the multifunctional end effector determining an electrical contact resistance between the contacted cable and the electrical connection, or by applying a specific force to the cable end against a direction of insertion of the cable end into a spring clamp terminal or a screw terminal of the connection.

An arrangement for carrying out the method described above may comprise at least one robot, for example at least one bent-arm robot, with a multifunctional end effector, wherein the robot may comprise a transport system via which a cable sequence of several interconnected cables is fed to the multifunctional end effector. The multifunctional end effector can have a gripper for gripping a cable end of the cable sequence and/or a detection device for detecting the connection area and/or a separation device for separating a connection area between successive cables of the cable sequence and/or for detaching an end-positioned cable from the cable sequence.

The arrangement may comprise a first and a second robot with a multifunctional end effector each, wherein the multifunctional end effectors of the two robots may have different or the same functionalities. The first robot may be configured to feed a first of the two cable ends of a cable from the cable sequence to an electrical connection of a first of the electronic components. The second robot can be configured to feed a second of the two cable ends of the cable to an electrical connection of a second of the electronic components.

The two robots can be configured to guide the cable with the cable end to the other robot which is feeding the respective first or second cable end to an electrical connection of one of the electronic components and, optionally, to lay it in a cable duct on the workpiece, in particular a mounting plate.

The arrangement may further comprise a workpiece carrier which is configured to hold a workpiece, in particular a mounting plate, to feed the workpiece to at least one processing station, in particular the robot, and to orient it with respect to the processing station.

The arrangement may comprise a first and a second robot with a multifunctional end effector each, a first of the robots holding a first end of a flexible cable and a second of the robots holding a second end of the flexible cable, and the robots being configured to maintain the flexible cable at a mechanical tension such that the cable is substantially straight between the ends. This prevents the cable from tangling during wiring despite its flexibility.

The multifunctional end effector may comprise a sensor which is configured to detect a position of an electrical component to be wired on the workpiece and/or a position and/or orientation of a terminal of the electrical component.

The arrangement can have a data processing system in which a circuit diagram of an electrical switchgear to be produced on the workpiece is stored, the data processing system being configured to supplement wiring information stored in the circuit diagram of the components arranged on the workpiece with position information and/or orientation information detected by the sensor, or, when the circuit diagram already comprises initial information of position and/or orientation, to update this initial information according to the detected position information and/or orientation information.

For the control of the robot, ECAD data can be used as a first input, which contain a plan of the switchgear to be produced with the arrangement, in particular a circuit diagram of the wiring to be produced for the electronic components arranged on the workpiece, wherein for the control of the robot, the position information and/or orientation information detected by the sensor can be used as a second input. A data processing system of the arrangement can be configured to generate the control of the robot from the first and the second input.

The information required for wiring, in particular a circuit diagram, can be provided directly from an ECAD system. In a first step after the engineering of the switchgear, the project to be wired can be checked for its suitability for automation using a test routine. In a second step, the project, which may optionally be optimized, can be imported to the data processing system for controlling the robot and a robot program for controlling the robot can be automatically generated from it. In a third step, the mounting plate with all the components on it can be scanned for identifying and locating the electronic components. Afterwards, the determined actual data of the electronic components can be compared with the information stored in the ECAD data and updated.

The identifying and locating can involve reading a product identification code, an RFID chip or the like.

The multifunctional end effector of the robot may comprise a scanner for the locating and identifying of the electronic components or the wiring position on the mounting plate, respectively. The multifunctional end effector may also comprise a sleeve with detection, separation and transport function for feeding and separating the individual cables, as well as a gripper with integrated sensor technology for handling the separated individual cables and, optionally, a tool for opening spring terminals and a screwdriver for opening and closing screw terminals.

The use of the robot, including the multifunctional end effector located on it, allows contacting the cables in different directions, especially in vertical direction (perpendicular to the mounting plate), in horizontal direction (parallel to the mounting plate), but also in an angled position (1-89° in relation to the plane of the mounting plate).

When or immediately after the contacting of the individual cable ends, a function and quality control can be carried out, which includes the monitoring of a defined pull-off force for connection terminals and a defined torque for screw terminals.

Furthermore, the arrangement can be configured to be integrated into a value chain for the production of switchgear and for this purpose, the arrangement described above can have one or more interfaces, e.g. an interface to an ECAD system, to an (automatic) assembly process with which the electronic components are arranged on the workpiece, an interface to a system for (fully automatic) cable assembly, so that non-automatable connections can be produced in parallel to the production process, an interface to a manual wiring process, for example by means of "Smart Wiring" using augmented reality systems for the pre- and/or post-wiring of non-automatable wire connections, and/or an interface to an (automatic) test process of the completely wired switch cabinet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
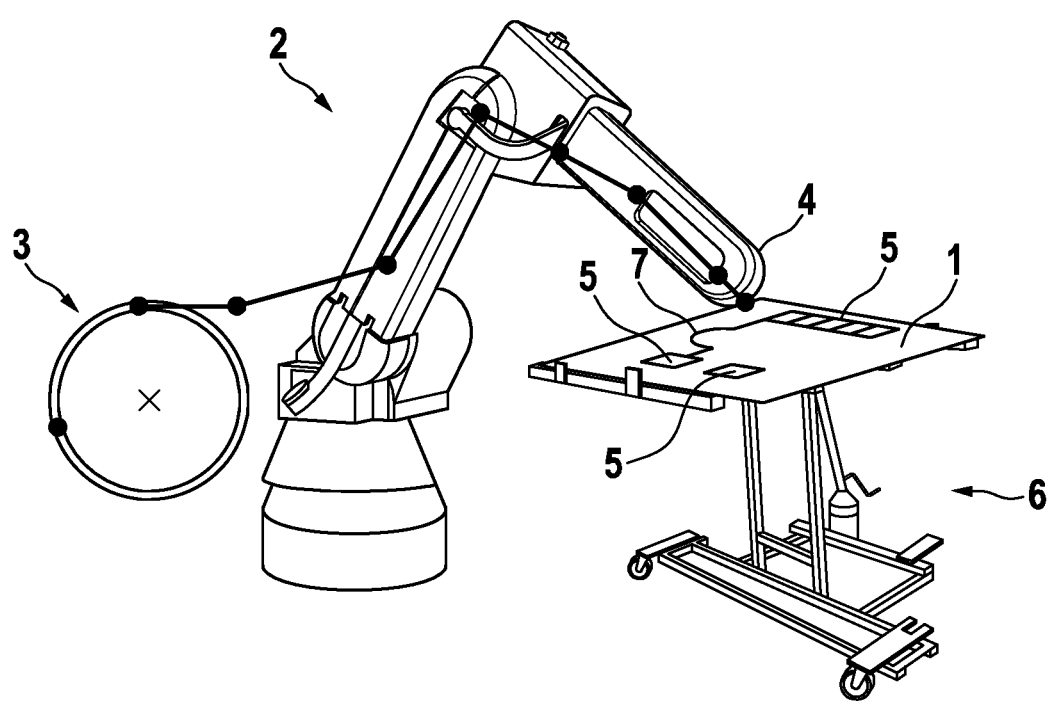
Figure 3:
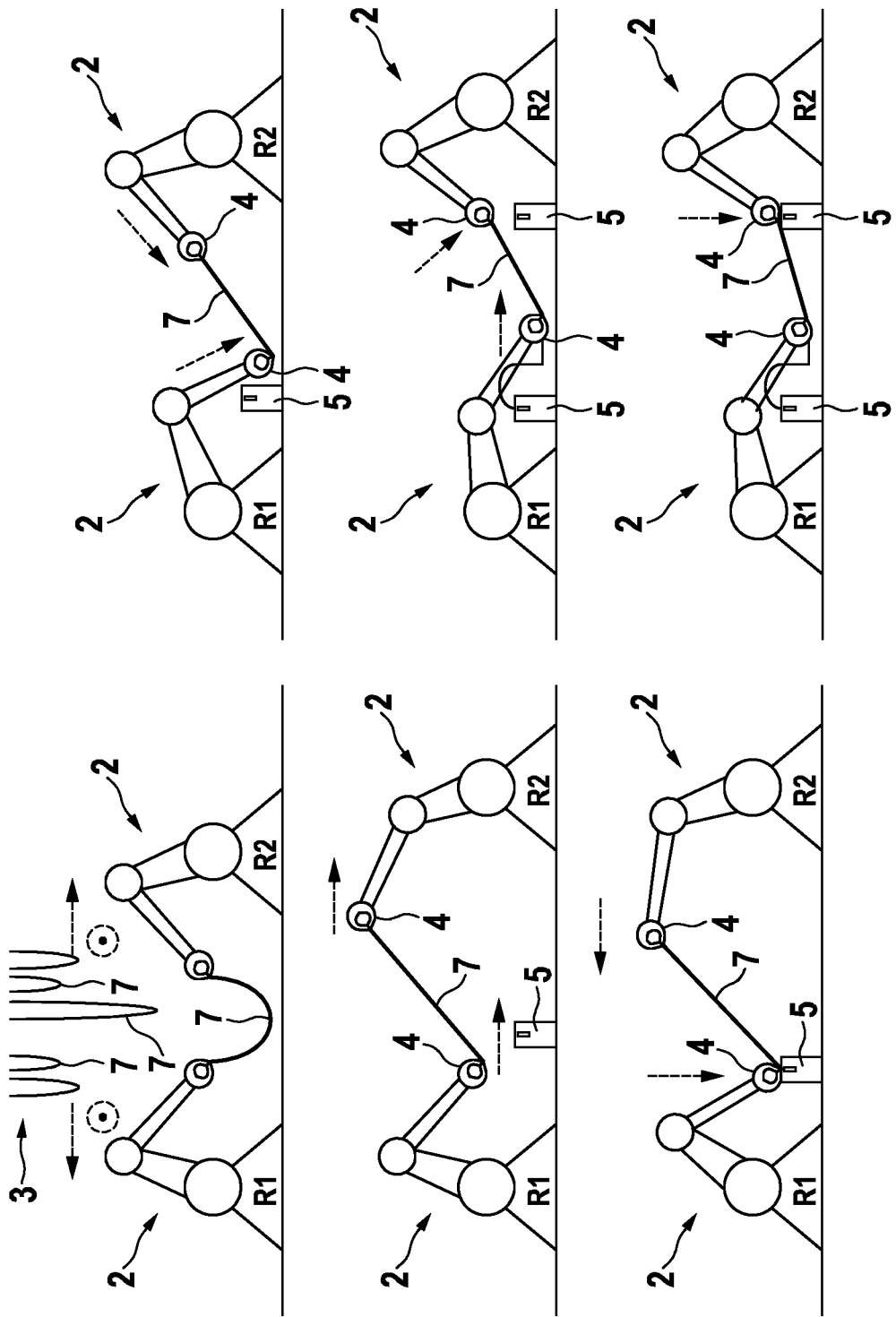

Further details of the invention are explained using the figures below. These show:

FIG. 1 schematically an embodiment of a method for electrical wiring of electronic components in switchgear construction;

FIG. 2 an arrangement for carrying out the method according to the invention;

FIG. 3 another arrangement for carrying out the method according to the invention.

DETAILED DESCRIPTION

Example embodiments will now be described more fully with reference to the accompanying drawings.

Accordingly, according to FIG. 1, a method for electrical wiring of electronic components in switchgear construction comprises the providing 100 of a plurality of electronic components which are mounted on a shared workpiece, for example on a mounting plate. After providing the workpiece with electronic components, these can be wired in a step 200.

Providing 100 of the electronic components on the workpiece, in particular a mounting plate, can include the engineering of the switchgear in an ECAD system. The switchgear to be produced is designed computer-aided in so far as at least all information for the wiring of the components is available. In addition to the individual cable connections to be produced, this can include the arrangement and type of the individual components, as well as the type of existing connection terminals and their individual feed direction for a cable end.

However, the ECAD data can also include information that goes beyond the wiring of the components. In particular, this can be information concerning the processing of the mounting plate, for example the formation of cut-outs in the mounting plate, which are necessary for the arrangement of the components on the mounting plate or for the air-conditioning of the components on the mounting plate. In particular, the ECAD system can also specify an order in which the components are wired together. In accordance with this order, the cables can be fed to a robot for wiring the electronic components in the form of a cable sequence with a predefined cable order. A corresponding cable sequence is known from DE 10 2015 103 444 A1.

Providing the mounting plate can also include identifying 110 and locating 120 of the electronic components on the shared workpiece, especially the mounting plate. In particular, due to manufacturing tolerances in the arrangement of the components on the workpiece, it is possible that the actual position as well as the actual cable feed direction for wiring the components may deviate from corresponding data provided by an ECAD system, for example. Thus, a circuit diagram can be provided via the ECAD system which shows the arrangement of the electronic components on the mounting plate as well as the exact wiring of the individual components with each other. The circuit diagram can contain initial position information of at least one of the components in relation to the workpiece. When it has been determined in the course of identifying 110 and locating 120 of the electronic components that at least one of the components has a different position with respect to the workpiece than the initial information, the initial position information provided via the ECAD system can be corrected accordingly (step 130) after identifying 110 and locating 120 has been performed. Identifying 110 can be done optically or electromagnetically, for example by optical reading of a one- or multi-dimensional bar code or by electromagnetic reading of an RFID code.

Furthermore, in a step 140, a position and an orientation of the electrical connection of one of the electronic components can be determined and compared with a predetermined information or, if such information is not available, added to the existing position information. When a deviation is detected, the predetermined information can be updated accordingly. Furthermore, in a step 150 interfering contours in the area surrounding the electrical connection can be detected, wherein, optionally taking into account the position and orientation of the electrical connection as well as any detected interfering contours and, optionally, further taking into account the degrees of freedom of movement of the robot, a feed direction of a cable end of the cable sequence to the connection is determined.

Finally, in a step 170, the cable sequence can be fed to a separating device of the multifunctional end effector 4, with which the end-positioned cable with the cable end in the cable sequence is detached or separated from the cable sequence. The separating of the end-positioned cable from the cable sequence can be carried out before the cable end is wired, i.e. before the cable end is connected to a connection of an electronic component, or afterwards.

In a step 200, the electronic components are wired according to a predetermined circuit diagram, which can be derived from the ECAD system or is provided directly by it, in a predetermined order by a robot, for example by at least one bent-arm robot. A cable sequence of pre-assembled cables is fed to the robot, with the individual cables of the cable sequence being arranged in the predetermined order.

Wiring comprises gripping 201 of a cable end of the cable sequence by a multifunctional end effector of the robot, feeding 202 of the cable end to an electrical connection of one of the electronic components by the multifunctional end effector, and detaching 203 of the cable from the cable sequence by a separation unit of the multifunctional end effector. For detaching a cable from the cable sequence, the robot can have a detection sleeve through which the cable sequence is passed, the sleeve having a sensor which detects a connection area between successive cables of the cable sequence. After locating the connection area between two successive cables, the cable sequence can be fed to the separating device of the multifunctional end effector in the step 170 so that the separating device can separate the connection area between the successive cables. A suitable separation module is known from DE 10 2014 116 772 A1.

The wiring can also comprise contacting 204 the cable that was separated or detached in step 203, for example to a conductor connection clamp of an electronic component. Furthermore, the contacted cable can subsequently be laid in step 205 on a workpiece, for example a mounting plate, especially in a cable duct mounted on a mounting plate, in step 205. Finally or previously, the contacting of the cable in step 204 can be checked in a step 206. This can include a mechanical test (e.g. pull-off test) and/or an electrical test (e.g. contact resistance). All test steps can be performed by the multifunctional end effector.

FIG. 2 shows an exemplary set-up of an arrangement for the electrical wiring of electronic components in switchgear construction. This arrangement essentially consists of at least one bent-arm robot 2 with a multifunctional end effector 4, wherein a cable sequence 3 in the form of a coil is assigned to the bent-arm robot 2. The multifunctional end effector 4 has a transport system via which the cable sequence 3 is fed to the multifunctional end effector 4. The cable sequence 3 consists of a concatenation of a multitude of pre-assembled individual cables, which are connected to each other via their cable ends to form a cable sequence.

The end effector 4 also has means for locating and identifying the components 5 on the mounting plate 1. As previously described with reference to FIG. 1, this can be used in particular to detect an actual arrangement of components 5 on the mounting plate 1 and, optionally, to match it with respective predetermined information and, optionally, correct it, which predetermined information may be provided by an ECAD system. It is also conceivable that the end effector 4 is configured to locate the respective connection of the components 5 and, optionally, to determine an optimum feed direction of a cable end to the connection, wherein, optionally, interference contours which have been detected with the end effector 4 can also be taken into account. Furthermore, the end effector 4 has a separating device by which the respective end-positioned cable can be separated from the cable sequence 3. The separating of the cable from cable sequence 3 may involve the separating of a connection area between the end-positioned cable and a cable immediately following in cable sequence 3.

The arrangement also comprises a workpiece carrier 6, which is configured to swivel the mounting plate in relation to the bent-arm robot so that optimum wiring, in particular feeding the cable end to the connection of a respective component 5, is possible. With the aid of the workpiece carrier 6, further degrees of freedom of movement can thus be provided beyond the degrees of freedom of movement of the bent-arm robot 2, thereby further facilitating the wiring of the components, in particular the feeding of the cable ends to the connections of the electronic components 5.

Furthermore, the workpiece carrier 6 can have the function of swivelling the workpiece 1, in particular the mounting plate, at least between a vertical orientation in which the workpiece carrier 6 receives the workpiece 1 and a horizontal orientation, or an orientation which is offset from the vertical by an angle between 1° and 89°.

The workpiece carrier 6 can also be configured to transport the mounting plate 1 between the individual processing stations of a value chain for the production of a switchgear. In particular, the workpiece carrier 6 can be configured to move the workpiece 1, in particular the mounting plate, out of the switch cabinet housing via the side wall of a switch cabinet housing by taking the mounting plate 1 out of the switch cabinet housing parallel to the rear wall and the door side of the switch cabinet housing, then to feed it to the individual processing stations, in particular also to the arrangement according to FIG. 2, and then, i.e. after completion of the switchgear on the mounting plate, moving it back into the switch cabinet housing so that the mounting plate never has to leave the workpiece carrier 6 during all processing steps of the mounting plate and in between.

FIG. 3 shows an exemplary movement sequence of an arrangement of two robots 2 formed as bent-arm robots, which collaboratively carry out a method according to the invention, for example the method described with reference to FIG. 1. Merely to simplify the presentation of the invention, the procedure is divided into six sub-steps. Here, the cable sequence 3 is provided exemplarily in the form of a cable magazine, which is arranged above the robots 2. With regard to alternative ways of the providing of the cable sequence as well as with regard to the separating of the individual cables from the cable sequence, reference is made to the preceding embodiments according to FIGS. 1 and 2.

In the embodiment shown in FIG. 3, the movement sequence of the collaborating robots 2 is represented in six sub-steps, whereby sub-step 1 according to FIG. 3 shows the beginning of the movement sequence in which a cable 7 is separated or detached from the cable sequence 3 by the two robots 2 and picked up at each of its opposite ends by one of the robots 2 by means of its end effector 4. The cable 7 is usually, and as shown, a flexible part which, after being picked up by the two robots 2, is set to a mechanical tension such that the cable assumes a substantially straight shape, as shown in FIG. 2 and maintained throughout the entire subsequent process, in order to avoid accidental tangling of the cable 7, for example on components on a workpiece.

In sub-step 2, the robot 2 on the left in the figure feeds the cable end it has gripped to a contact terminal of an electronic component 5, wherein the cable 7 is guided accordingly by the robot 2 on the right in the figure.

In step 3, the robot 2 on the left in the figure contacts the cable end of cable 7 assigned to it on component 5. For this purpose, the robot 2 on the left in the figure can insert the cable end into a conductor connection clamp of component 5. Optionally, this step can be followed by a test step, for example in the form of a pull-off test, in which the robot 2 on the left in the figure attempts to pull the contacted cable end out of the conductor connection clamp of component 5 with a specified pull-off force. In a fourth step, the cable 7 is laid, for example, along a cable duct starting from the contacted component 5 and is approached to a further component 5 in the figure to the right of the contacted component 5, with which the component 5 on the left in the figure is to be wired.

In steps 5 and 6, the further cable end of the conductor 7 is fed to the further electronic component 5 and contacted with it, wherein the robot on the left in the figure fixes the cable in the area between the components 5, for example in a cable duct in which the cable 7 has been laid in step 4, in order to prevent the cable 7 from accidentally jumping out of its laid path, for example a cable duct.

After the second cable end has also been contacted with the further component 5 in step 6, the contacting can also be checked mechanically and/or electrically if necessary, for example by means of a pull-off test or a check of the ohmic contact resistance.

After step 6, the two robots 2 can extract another cable 7 from the cable sequence 3 and the procedure can accordingly start again from the first step.

The features of the invention disclosed in the above description, drawings and claims may be essential for the realization of the invention either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for electrical wiring of electronic components in switchgear construction, the method comprising the steps:
  a. providing a plurality of electronic components which are mounted on a shared workpiece, in particular on a mounting plate;
  b. wiring the electronic components according to a predetermined circuit diagram and in a predetermined order by at least one robot, wherein a cable sequence of pre-assembled cables is fed to the at least one robot and the cables are arranged in the predetermined order in the cable sequence;
  wherein the wiring comprises gripping a cable end of the cable sequence by a multifunctional end effector of the at least one robot, feeding the cable end to an electrical connection of one of the electronic components by the multifunctional end effector, and detaching the cable from the cable sequence by s drpsaration unit of the multifunctional end effector
  wherein the at least one robot is a bent-arm robot, wherein the at least one robot comprises a transport system via which a cable sequence of several interconnected cables is fed to the multifunctional end effector, wherein the multifunctional end effector has a gripper for gripping a cable end of the cable sequence; and
  wherein said at least one robot includes first and a second robots each with a multifunctional end effector, wherein the multifunctional end effectors of the two robots have different or the same functionalities, wherein the first robot is configured to feed a first of the two cable ends of a cable from the cable sequence to an electrical connection of a first of the electronic components, and wherein the second robot is configured to feed a second of the two cable ends of the cable to an electrical connection of a second of the electronic components.

2. The arrangement according to claim 1, which further comprises a workpiece carrier which is configured to hold a workpiece, in particular a mounting plate, to feed the workpiece to at least one processing station, in particular the at least one robot, and to orient it with respect to the processing station.

3. The arrangement according to claim 1, in which the multifunctional end effector comprises a sensor which is configured to detect a position of an electrical component to be wired on the workpiece or a position and/or orientation of a terminal of the electrical component.

4. The arrangement according to claim 3, which has a data processing system in which a circuit diagram of an electrical switchgear to be produced on the workpiece is stored, the data processing system being configured to supplement wiring information stored in the circuit diagram of the components arranged on the workpiece with position information or orientation information detected by the sensor, or, when the circuit diagram already comprises initial information of position or orientation, to update this initial information according to the detected position information or orientation information.

5. The arrangement according to claim 3, in which for the control of the at least one bent-arm robot, ECAD data is used as a first input, which contain a plan of the switchgear to be produced with the arrangement, wherein for the control of the at least one bent-arm robot, the position information or orientation information detected by the sensor is used as a second input, and wherein a data processing system of the arrangement is configured to generate the control of the at least one bent-arm robot from the first and the second input.

6. A method for electrical wiring of electronic components in switchgear construction, the method comprising the steps:
  a. providing a plurality of electronic components which are mounted on a shared workpiece, in particular on a mounting plate;
  b. wiring the electronic components according to a predetermined circuit diagram and in a predetermined order by at least one robot, wherein a cable sequence of pre-assembled cables is fed to the at least one robot and the cables are arranged in the predetermined order in the cable sequence;
  wherein the wiring comprises gripping a cable end of the cable sequence by a multifunctional end effector of the at least one robot, feeding the cable end to an electrical connection of one of the electronic components by the multifunctional end effector, and detaching the cable from the cable sequence by a separation unit of the multifunctional end effector
  wherein the at least one robot is a vent-arm robot, with a multifunctional end effector, wherein the at least one robot comprises a transport system via which a cable sequence of several interconnected cables is fed to the multifunctional end effector, wherein the multifunctional end effector has a gripper for gripping a cable end of the cable sequence; and
  wherein said at least one robot includes a first and a second robot each with a multifunctional end effector, a first of the robots holding a first end of a flexible cable and a second of the robots holding a second end of the flexible cable, and the robots being configured to maintain the flexible cable at a mechanical tension such that the cable is substantially straight between the ends.

7. The arrangement according to claim 6, which further comprises a workpiece carrier which is configured to hold a workpiece, in particular a mounting plate, to feed the workpiece to at least one processing station, in particular the at least one robot, and to orient it with respect to the processing station.

8. The arrangement according to claim 6, in which the multifunctional end effector comprises a sensor which is configured to detect a position of an electrical component to be wired on the workpiece or a position or orientation of a terminal of the electrical component.

9. The arrangement according to claim 8, which has a data processing system in which a circuit diagram of an electrical switchgear to be produced on the workpiece is stored, the data processing system being configured to supplement wiring information stored in the circuit diagram of the components arranged on the workpiece with position information or orientation information detected by the sensor, or, when the circuit diagram already comprises initial information of position or orientation, to update this initial information according to the detected position information or orientation information.

10. The arrangement according to claim 9, in which for the control of the at least one bent-arm robot, ECAD data is used as a first input, which contain a plan of the switchgear to be produced with the arrangement, wherein for the control of the at least one bent-arm robot, the position information or orientation information detected by the sensor is used as a second input, and wherein a data processing system of the arrangement is configured to generate the control of the at least one bent-arm robot from the first and the second input.

* * * * *